C. G. SWEBILIUS & H. T. R. HANITZ.
SAFETY MECHANISM FOR FIREARMS.
APPLICATION FILED AUG. 5, 1914.
1,129,527.
Patented Feb. 23, 1915.
4 SHEETS—SHEET 1.
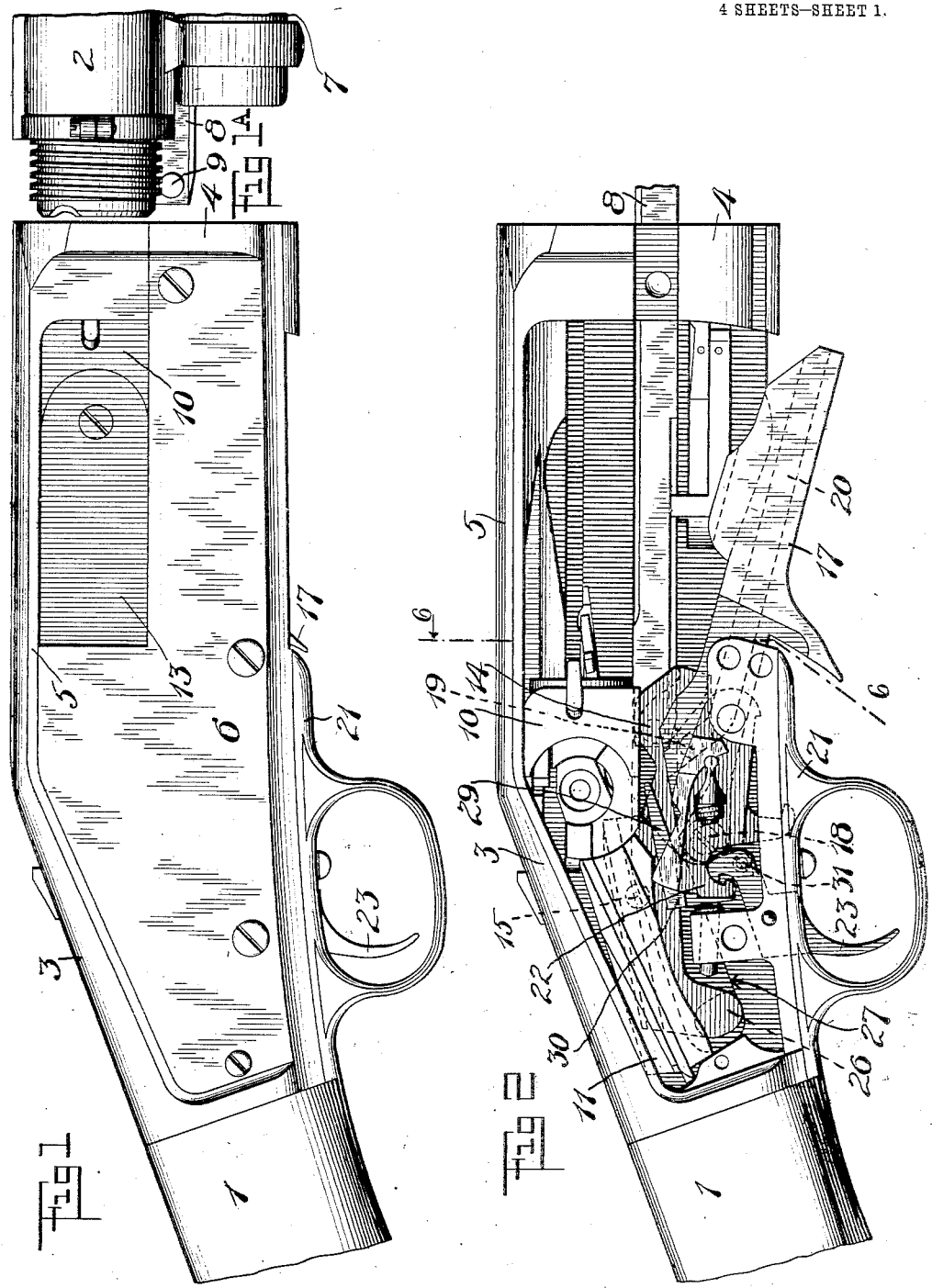

C. G. SWEBILIUS & H. T. R. HANITZ.
SAFETY MECHANISM FOR FIREARMS.
APPLICATION FILED AUG. 5, 1914.
1,129,527.
Patented Feb. 23, 1915.
4 SHEETS—SHEET 2.
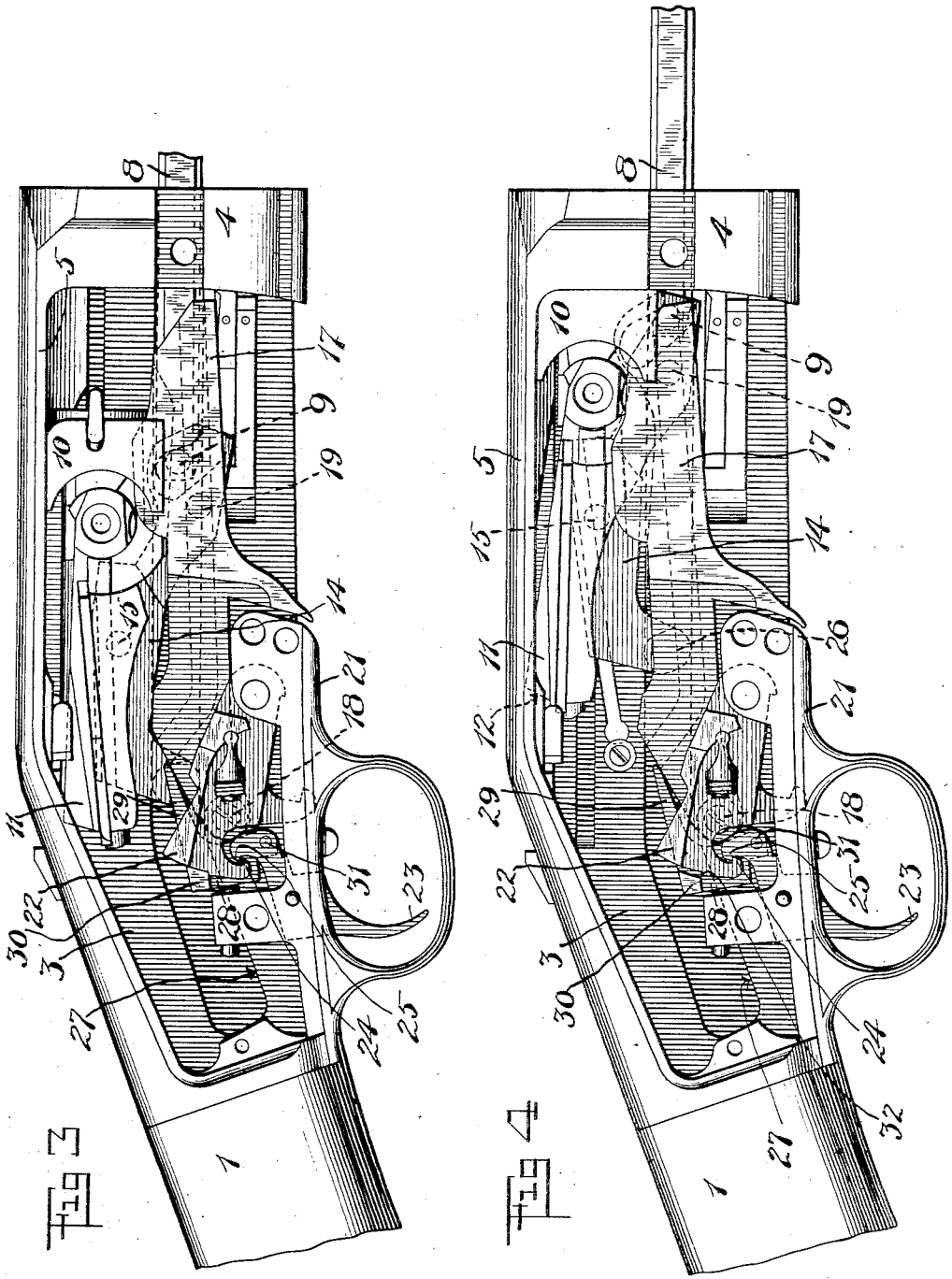

C. G. SWEBILIUS & H. T. R. HANITZ.
SAFETY MECHANISM FOR FIREARMS.
APPLICATION FILED AUG. 5, 1914.
1,129,527.
Patented Feb. 23, 1915.
4 SHEETS—SHEET 3.
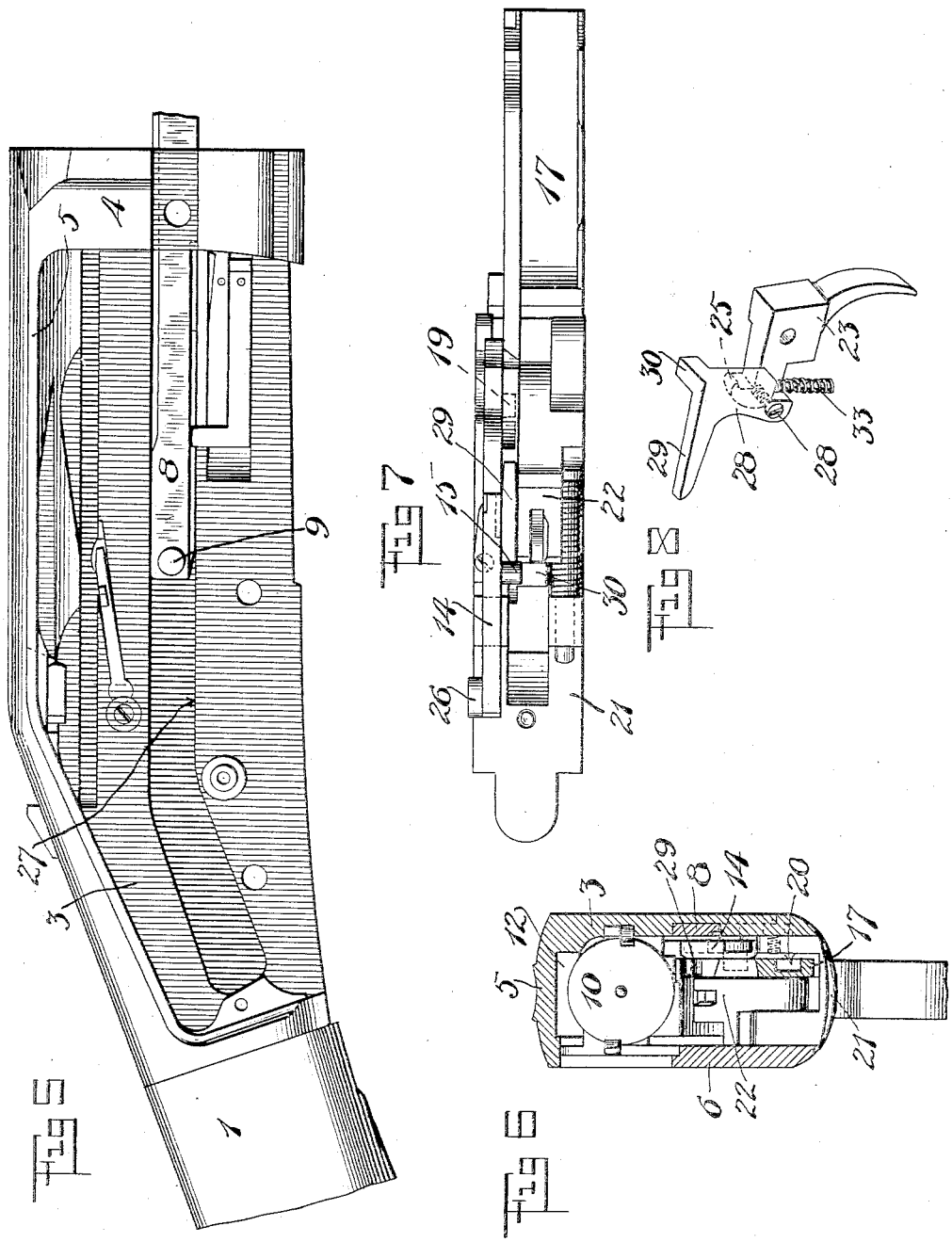
Witnesses:
C. J. Hachenberg
Inventors
C. G. Swebilius
H. T. R. Hanitz
By their Attorneys C. G. SWEBILIUS & H. T. R. HANITZ.
SAFETY MECHANISM FOR FIREARMS.
APPLICATION FILED AUG. 5, 1914.
1,129,527.
Patented Feb. 23, 1915.
4 SHEETS—SHEET 4.
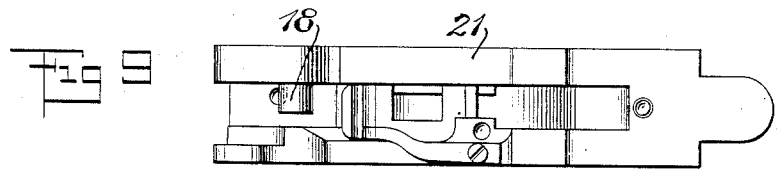
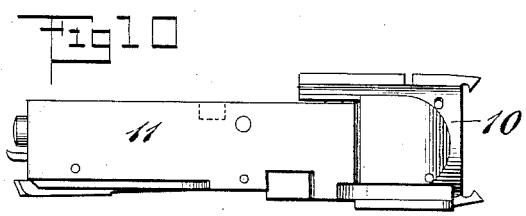
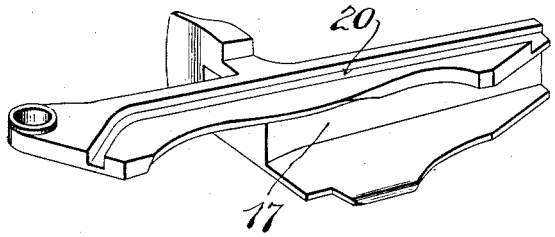
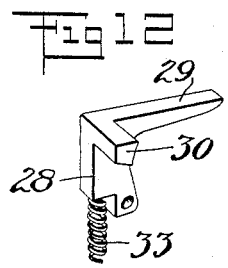
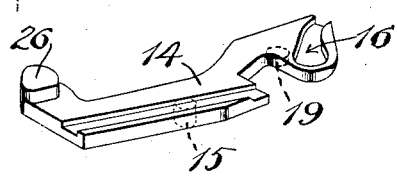
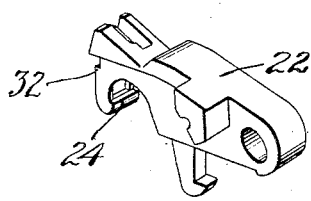
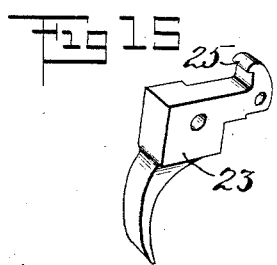
Witnesses:
C. J. Hachenberg
Stanley B. Davis
Inventors
C. G. Swebilius
H. T. R. Hanitz
By their Attorneys

UNITED STATES PATENT OFFICE.

CARL GUSTAF SWEBILIUS AND HANS T. R. HANITZ, OF NEW HAVEN, CONNECTICUT, ASSIGNORS TO MARLIN FIREARMS COMPANY, A CORPORATION OF CONNECTICUT.

SAFETY MECHANISM FOR FIREARMS.

1,129,527.  Specification of Letters Patent.  Patented Feb. 23, 1915.

Application filed August 5, 1914. Serial No. 855,086.

*To all whom it may concern:*

Be it known that we, CARL G. SWEBILIUS and HANS T. R. HANITZ, a citizen of the United States and a subject of the Emperor of Germany, respectively, both residing at New Haven, New Haven county, Connecticut, have invented certain new and useful Improvements in Safety Mechanism for Firearms, of which the following is a full, clear, and exact description.

Our invention relates to firearms and particularly to an improved safety mechanism to guard against premature discharge.

In illustrating our invention, we have shown it in connection with a firearm such as set forth in U. S. Letters Patent No. 943,828 of December 21, 1909, to which patent we direct attention for a detailed description of the construction and operation of the main working parts.

In the drawings, Figure 1 is a side elevation of the breech portion of a firearm, showing a part of the stock, the breech being closed; Fig. 1ᵃ is a side elevation of the rear end of the barrel and associated parts; Fig. 2 is a side elevation of the breech mechanism with the side plate removed, showing the breech fully open; Fig. 3 is a similar view showing the breech mechanism, partially closed; Fig. 4 is a similar view showing the breech mechanism fully closed; Fig. 5 is a similar view with most of the working parts removed; Fig. 6 is a cross-section on the line 6—6, Fig. 2; Fig. 7 is a plan view of the trigger guard and certain associated parts; and Figs. 8 to 15 inclusive are detail views.

It should be understood that we have shown our invention only in its preferred form and that it may be modified in a variety of ways.

In the drawings, 1 is the stock; 2 the barrel; 3 the receiver-frame; 4 the front reinforce, and 5 the top-plate of the breech or receiver. The receiver can be fully opened at one side by removing the side plate 6.

7 is a magazine.

8 is a reciprocating action rod. The action rod 8 leads through the front reinforce into the receiver and makes a connection through the medium of a pin 9 with the internal breech mechanism so that said breech mechanism may be operated upon the reciprocation of said rod. The breech block is what we may term a combined breech block and locking bolt.

10 is the head end of the breech block which carries the usual extractor devices. 11 is the tail end or locking bolt. In this particular instance the said two parts 10 and 11 are hinged together, so that at the proper time the locking bolt 11 may be swung up into locking position wherein it engages a lock-up shoulder 12 on the under side of the top-plate 5.

13 is the plate carried by the breech block and pivoted concentrically with the swinging tail-piece or locking bolt 11.

On the opposite side of the breech block from that shown in Figs. 2 to 4 is what we may term an intermediate link or rocking member 14. This member carries a stud 15, which takes into a recess in the side of the locking bolt 11. The pin 9 of the action rod normally stands in a cam slot or groove 16 in the forward end of the intermediate link 14.

17 is a carrier arranged to perform the usual function, the said carrier being pivoted at 18.

19 is another stud on the intermediate link 14, said stud extending in a cam groove 20 in the side of the carrier 17. As the action rod 7 is moved to and fro, the carrier will be moved up and down in accordance with the design of the cam groove 20.

21 is a frame, including the trigger guard and designed to support the hammer 22 and trigger 23. The hammer is provided with a shoulder or hook 24, which is arranged to be engaged by a shoulder or hook 25 at the inner end of the trigger.

The rear end of the intermediate link 14 has a lateral projection 26, which constitutes a bearing, which is supported by a ledge 27, at the inner side of the left side plate of the receiver, the said ledge being properly shaped to permit the parts to reciprocate when desired. The locking-up of the gun is effected by the last forward movement of the action rod 8, which forward movement causes the forward end of the intermediate link 14 to move up quickly. This movement of the link is also transmitted through the stud 15 to the swinging bolt 11, which is thereby moved up into the locking position shown in Fig. 4.

It is obvious that before the gun may be fired with safety, it is absolutely essential that the gun shall be fully locked, and to that end we provide means whereby the hammer cannot be released until the locking act is completed. It is to this particular feature of improvement that the present invention relates. Up to this point the various parts described are substantially such as are shown and described in the patent above referred to and for a further detailed description as to the construction and operation of these parts we direct attention to said patent.

The safety mechanism to which our present invention relates comprises a unique construction and arrangement of safety sear associated with the trigger and hammer, and one of the moving parts of the breech mechanism whereby the hammer cannot be released from its cocked position until the gun is fully locked. A detail of the safety sear is shown in Fig. 12 and will be seen to comprise a main body 28, a trip-arm 29, and a laterally projecting hammer locking shoulder 30. This sear is pivoted at 31 to the trigger 23, the pivot 31 being eccentric to or out of line with the pivot upon which the trigger swings. In the specific form shown the pivotal connection 31 is effected between the lower end of the sear body and the forward end of the trigger as best seen in Fig. 8, so that when the finger piece of the trigger is pulled back, the sear will be drawn down. The hammer 32 is provided at its outer end with a shoulder 32, which is arranged to be engaged by the lateral extension 30 of the sear when the hammer is cocked by the reciprocation of the breech mechanism (see Fig. 3). A spring 33 is provided to cause the sear to normally move in a direction to engage the hammer. As shown in Fig. 3, the various parts are moved only partially toward the closed or locked position. When, however, the breech is fully locked up as shown in Fig. 4, it will be observed that the locking shoulder 30 of the sear has been disengaged from the hammer locking shoulder 30. This is effected by causing one of the parts of the breech mechanism, in this instance the carrier 17, to engage the trip arm 29 of the sear and swing it back from the position shown in Fig. 3 to that shown in Fig. 4. This movement is effected by the last quick upward movement of the carrier, which occurs simultaneously with the final locking movement of the locking bolt 11.

From the foregoing, it will be seen that so long as the gun is not perfectly locked, and the carrier has not reached its uppermost position, the pulling of the trigger will not release the hammer so that it can fall. At such a time the sear will engage the hammer and hold the latter down. When the gun is fully locked, if the trigger is pulled and held back, the operation of the breech mechanism will act automatically upon the safety sear in such a way that it will operate as an automatic trigger. By connecting the sear directly with the trigger, it is obvious that there is a direct coöperation of these parts whereby their action will be certain.

In Fig. 3 we have shown the breech only partially closed and the trigger partially pulled. This movement of the trigger, as will be seen, has disengaged the direct connection between the trigger and the hammer, but the hammer is still securely held by the indirect connection effected through the medium of the sear.

In Fig. 4 the trigger has been released and is directly engaging the hammer. In this view the sear is tripped by the carrier and cannot, therefore, swing forwardly to again engage the hammer, even though the trigger is pulled. Under these conditions the pulling of the trigger simply pulls down the rear end of the sear simultaneously with the releasing of the hammer, which may then spring forward past the locking shoulder 30 of the sear.

It will be understood, of course, that we have not described the various incidental parts of the breech mechanism, such as the ejector, cut-off and other details, since no improvement in such parts is involved herein.

What we claim is:

1. In a firearm, a receiver containing a breech bolt, a carrier, an intermediate link adapted to engage with an action rod moving back and forth therein, a hammer, a trigger and a safety sear pivotally mounted on said trigger eccentric to the axis of the trigger and arranged to engage said hammer, and means wholly independent of the trigger to disengage said sear from said hammer.

2. In a firearm, a receiver containing a breech bolt, a carrier, an intermediate link adapted to engage with an action rod moving back and forth therein, a hammer, a trigger and a safety sear pivotally mounted on said trigger eccentric to the axis of the trigger, said safety sear having a laterally extending lug to engage with the hammer and means wholly independent of said trigger to disengage said sear from said hammer.

3. In a firearm, a receiver containing a breech bolt, a carrier, an intermediate link adapted to engage with an action rod moving back and forth therein, a hammer, a trigger and a safety sear pivotally mounted on said trigger, said safety sear having a laterally extending lug to engage with the hammer and a forwardly extending arm for engagement with the carrier.

4. In a firearm, a receiver, locking mechanism inclosed therein including a carrier coöperating with the said locking mechanism, a hammer, a trigger, a safety sear pivotally mounted thereon, said safety sear being adapted to engage with the hammer and carrier and a spring between the receiver and the said safety sear mounted on the said trigger, adapted to keep the safety sear in engagement with the carrier and the trigger in engagement with the hammer.

5. In a firearm, a receiver inclosing the locking mechanism thereof, including a hammer, a carrier, a trigger, a safety sear pivotally mounted thereon eccentric to the axis thereof, said safety sear connecting with the said hammer and carrier so as to lock the hammer to prevent its falling into firing position when the trigger is pulled while the gun is not perfectly locked, substantially as described.

6. In a firearm, a receiver containing breech mechanism including a plurality of movable parts, a hammer, a trigger and a safety sear pivoted eccentrically of said trigger and coöperating directly between said trigger and hammer with trip means for said safety sear arranged to release the latter when the breech mechanism is fully locked ready for firing.

7. In a firearm, a receiver containing breech mechanism, including a plurality of movable parts, a hammer, a trigger and a safety sear pivotally mounted eccentrically on one of the last two mentioned parts, with means for rendering said safety sear ineffective when the gun is fully locked ready for firing.

8. In a firearm, a receiver containing a plurality of movable parts, a hammer, a trigger, a safety sear pivotally mounted eccentrically on said trigger and arranged to engage the hammer until the gun is fully locked, with means for moving said safety sear to the hammer disengaging position when said gun is fully locked ready for firing.

9. In a firearm, a receiver containing a plurality of movable parts including a locking bolt, means for operating said parts, a hammer, a trigger arranged to engage the hammer and hold it cocked, a safety sear carried eccentrically by said trigger and also arranged to engage the hammer to hold it cocked until the locking bolt is in its locking position, said safety sear coöperating between the trigger and hammer with means operable by one of the moving parts of the breech mechanism to move said sear into an inoperative position without disturbing the operative position of said trigger when the parts are fully locked up ready for firing.

CARL GUSTAF SWEBILIUS.
HANS T. R. HANITZ.

Witnesses:
   Fred E. Bradley,
   William C. Miller.